A. W. MEYER.
DEVICE FOR POACHING EGGS.
APPLICATION FILED NOV. 16, 1907.
920,973.
Patented May 11, 1909.
2 SHEETS—SHEET 1.
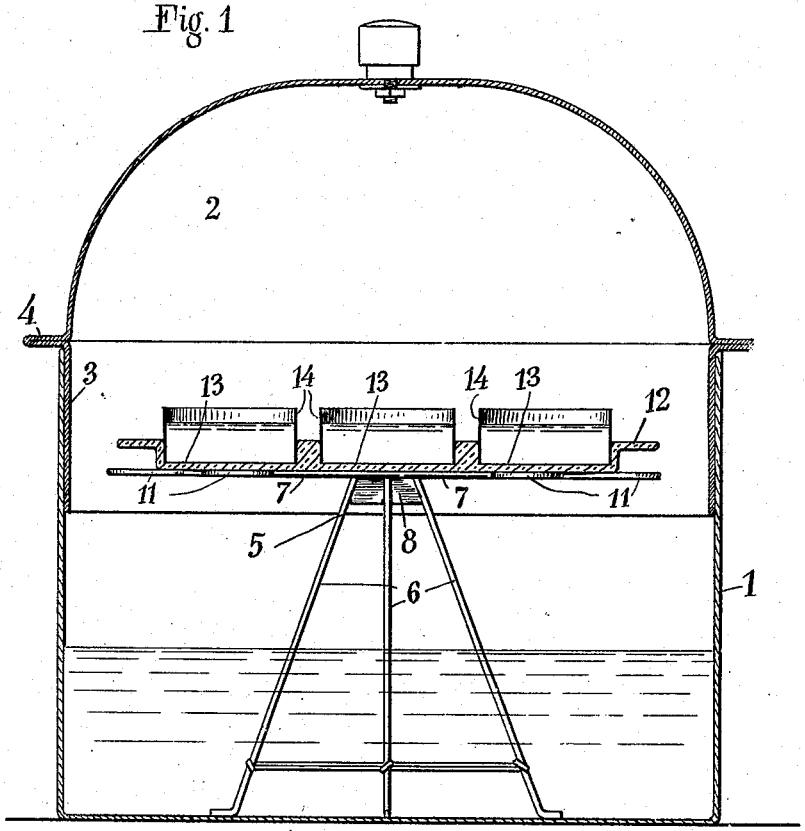
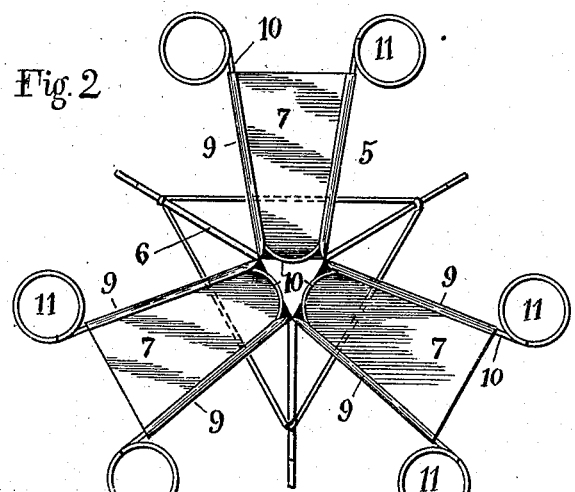
Witnesses
Richard Kuehne.
M. A. Riemann.
Inventor
Albert W. Meyer
By his Attorney
Ivan E. A. Konigsberg

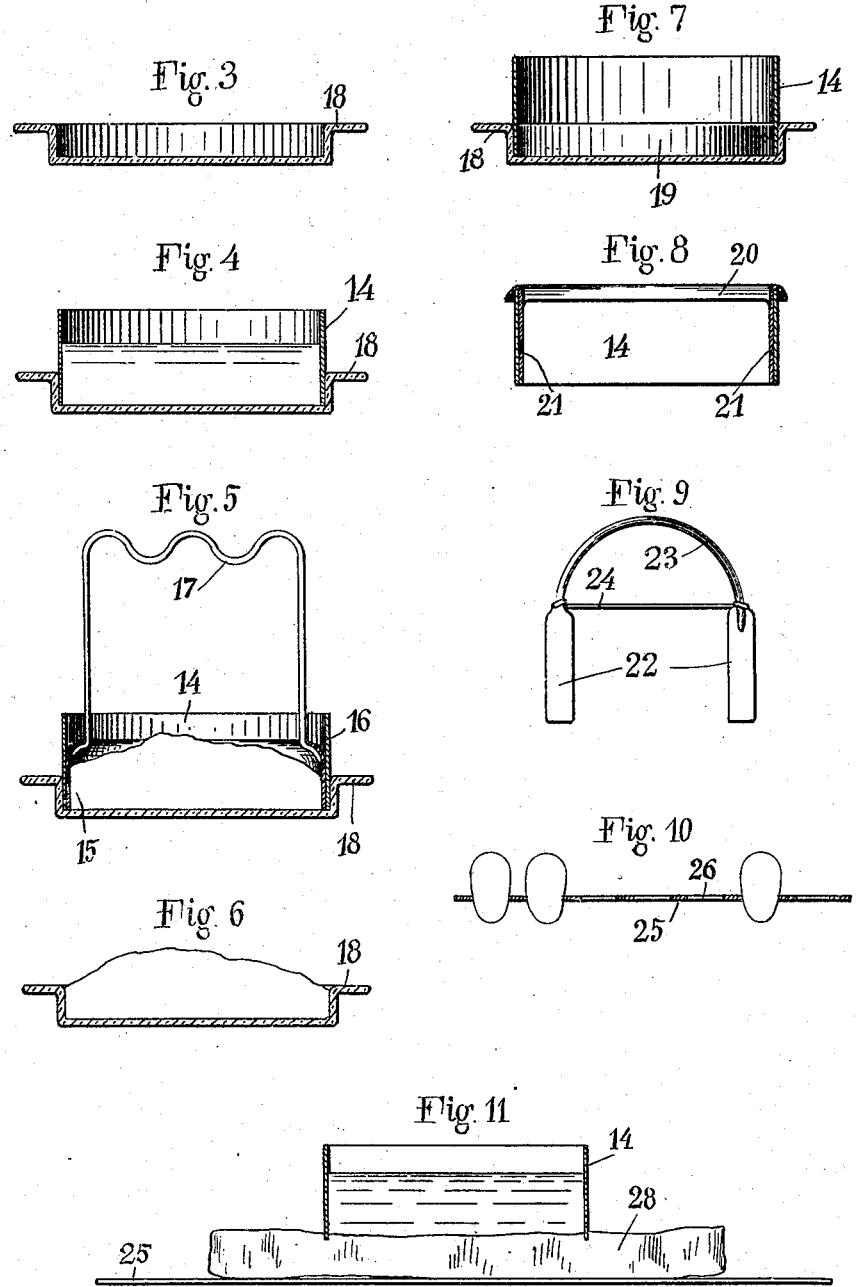

UNITED STATES PATENT OFFICE.

ALBERT W. MEYER, OF ROSELLE, NEW JERSEY.

DEVICE FOR POACHING EGGS.

No. 920,973.  Specification of Letters Patent.  Patented May 11, 1909.

Application filed November 16, 1907. Serial No. 402,412.

*To all whom it may concern:*

Be it known that I, ALBERT W. MEYER, a citizen of the United States of America, and a resident of Roselle, Union county, New Jersey, have invented certain new and useful Improvements in Devices for Poaching Eggs, of which the following is a specification.

This invention relates to cooking utensils and has particular reference to a device for use when poaching or cooking eggs.

The particular object of the invention is to provide a device, which may be manufactured at low cost, and by means of which eggs may be quickly, neatly and properly poached and served.

To this end the invention comprises such parts and combination of parts as will accomplish the desired result, and which are fully described in the following specification, and illustrated in the accompanying drawing, in which I have shown my invention in its preferred form, but as changes may occur, without materially altering the shape or form or construction of the different parts, I claim all such changes as come within the legitimate intent and scope of the claim.

In the said drawings: Figure 1 is a sectional view of a poaching utensil embodying my invention. Fig. 2 is a plan view of the supporting stand. Figs. 3, 4, 5 and 6 are detail views illustrating the operation of my device. Figs. 7, 8 and 9 illustrate various modifications. Fig. 10 shows how my invention may be used for cooking eggs and Fig. 11 shows how I use my device for poaching eggs on toast.

Referring now more particularly to Fig. 1, the reference numeral 1 denotes a cooking pot of suitable size, construction and material, which is covered by a deep cover 2 having the depending flange 3 and the horizontal flange 4 for the purpose of steam tightness. In said pot I provide a supporting stand 5 which I may construct as follows: A foot 6, preferably made of strong wires and stiffened as shown, supports three or more horizontal members or wings 7, which latter may be soldered to the foot and stiffened by having a depending portion 8 soldered to the wires forming the foot. The members 7 are provided with grooves 9 in which slide spring members 10 having eyes as 11. So it will be understood that by sliding the spring members 10 out or in, the size of the horizontal portion of the stand may be adjusted to suit any size pot. Upon said stand I place the plate 12 having circular depressions 13 in which rings 14 fit snugly. The plate is preferably made of porcelain, while the other parts of my invention may be made of metal.

When I want to poach one or more eggs, I break the same into the different compartments formed by the plate and the rings and cover the pot, which at this moment is now filled with sufficient boiling water and placed over a fire, or it has been previously filled with sufficient water which at this time is supposed to be boiling over a fire, and the eggs are poached by the steam rapidly arising from the water and confined within the pot by means of the cover. When the eggs are poached, I remove the plate from the pot and I then proceed to cut the poached eggs loose from the rings 14. To this end I employ a cutting member 15—see Fig. 5— which is in the shape of a ring having a shoulder 16, which fits snugly inside the ring 14 and is provided with a handle 17. I insert this cutting member inside the ring 14, give it a pressure or a turn to fully remove the rings 14 from the eggs and finally remove all the rings 14 by lifting them up together with the cutter. I then have a plate containing one or more poached eggs and I can then serve them.

The outfit as above described may serve for family use, but for use in hotels, restaurants and similar places, I prefer individual small plates 18, as shown in Fig. 3, which only holds one or more eggs, and in the Figs. 3, 4, 5 and 6, I have illustrated the various members used in the succession of operation ending with the finished poached egg in the plate or saucer 18. If, however, it is desired to remove the poached egg from either the plate 12 or small plate 18 before serving, I may employ a small plate or disk 19 or round cracker or piece of toast—see Fig. 7—which I place in the depression 13, and which is as high as the depression is deep. An inspection of Fig. 7 will show the operation when this disk is used. I first place the ring 14 in the depression 13, then drop the disk 19 inside the ring,—and these parts are made to fit snugly—, after the egg is poached, I use the cutter 15 to free the ring, 14, which is then removed and as the top of the disk 19 is flush with the top of the plate, the egg is readily removed.

In Figs. 8, and 9 are illustrated two different forms of cutting members. That shown in Fig. 8 comprises a ring portion 20 which fits over the ring 14 and is provided with two blades 21. The cutter shown in Fig. 9 consists of two blades 22 joined by the handle 23 which latter is stiffened by the wire or rod 24. These cutters are used like the cutter 15, which latter, however, is better because of the shoulder 16 which prevents the surface of the poached egg from being torn.

When I desire to poach the eggs on individual plates, I use a perforated plate 25 shown in Fig. 10, which is laid on the stand 5 and supports the individual poaching plates. The perforations 26 in the plate 25 are, however, made of such a size, that eggs can be inserted therein for the purpose of being cooked in the shell; I may, of course, also use the loops 11 in the spring members 10 for this purpose, so that I am able to poach and cook eggs in the shell at the same time.

To further illustrate the usefulness of my invention, I have shown in Fig. 11, a piece of toasted bread 28, upon which it is desired to serve poached eggs. In such case the piece of toast will serve as the plate 12, that is, I lay the toast on the perforated plate 25, insert the ring 14 directly in the toast by a gentle pressure and proceed as above described; and I may do the same thing with a dish, such as hash or the like.

The above is thought to fully describe and illustrate my invention, the advantage of which can be appreciated, when it is remembered how important it is both for restaurant and family use that dishes be served with the greatest neatness and of attractive appearance, and it is well known that poached eggs are very easily broken unless handled with the greatest care. But by the use of my invention, the eggs are quickly poached, either separately or directly on toast, steaks, etc., something which to the best of my knowledge it has not been possible to do heretofore.

It is, of course, not necessary to employ precisely the pot and stand as I have illustrated them, but the containing member, that is the plate, the ring for confining the egg, and the cutting member I consider essential for the successful operation. And the terms containing and confining member, I shall use in the claim to characterize these parts.

I claim:

A device for poaching eggs comprising in combination, a plate provided with a substantial depression, a removable sleeve fitting inside said depression for temporarily raising its sides and an egg receiving disk fitting within said sleeve having its upper surface flush with the upper surface of said plate, whereby, when said sleeve is removed, there will be no abutting sides around the egg.

Signed at New York, N. Y. this 15 day of Nov. 1907.

ALBERT W. MEYER.

Witnesses:
IVAN KONIGSBERG,
OLIN A. FOSTER.